United States Patent
Okutsu

(10) Patent No.: US 12,257,885 B2
(45) Date of Patent: Mar. 25, 2025

(54) VEHICLE DOOR STRUCTURE AND MANUFACTURING METHOD FOR VEHICLE DOOR STRUCTURE

(71) Applicant: TOYOTA JIDOSHA KABUSHIKI KAISHA, Aichi-ken (JP)

(72) Inventor: Makoto Okutsu, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/498,036

(22) Filed: Oct. 31, 2023

(65) Prior Publication Data

US 2024/0149647 A1    May 9, 2024

(30) Foreign Application Priority Data

Nov. 9, 2022 (JP) ................. 2022-179787

(51) Int. Cl.
| | | |
|---|---|---|
| *B60J 5/04* | (2006.01) | |
| *B60J 1/10* | (2006.01) | |
| *B60J 1/17* | (2006.01) | |
| *B60J 10/16* | (2016.01) | |
| *B60J 10/36* | (2016.01) | |
| *B60J 10/76* | (2016.01) | |

(52) U.S. Cl.
CPC ............ *B60J 5/0402* (2013.01); *B60J 1/10* (2013.01); *B60J 1/17* (2013.01); *B60J 10/16* (2016.02); *B60J 10/36* (2016.02); *B60J 10/76* (2016.02)

(58) Field of Classification Search
CPC ... B60J 5/0402; B60J 1/10; B60J 10/76; B60J 10/78
See application file for complete search history.

(56) References Cited

U.S. PATENT DOCUMENTS

| | | | |
|---|---|---|---|
| 7,425,032 B2 * | 9/2008 | Morikawa ................ | B60J 10/78 296/146.1 |
| 2003/0168882 A1 * | 9/2003 | Naito ...................... | B60J 10/78 296/146.2 |
| 2010/0156138 A1 * | 6/2010 | Terai ....................... | B60J 1/007 296/146.3 |
| 2020/0338972 A1 * | 10/2020 | Zia .......................... | B60J 10/70 |

FOREIGN PATENT DOCUMENTS

| | | | | |
|---|---|---|---|---|
| EP | 1447253 A1 * | 8/2004 | ............ | B60J 10/15 |
| JP | 2020-200008 A | 12/2020 | | |
| JP | 2021-104708 A | 7/2021 | | |
| WO | WO-2013166350 A1 * | 11/2013 | ........... | B60J 10/235 |

* cited by examiner

Primary Examiner — Marcus Menezes
(74) Attorney, Agent, or Firm — HAUPTMAN HAM, LLP

(57) ABSTRACT

The division bar is provided between a fixed window and a vertically slidable window. The division bar is made of resin. A fastening surface opposed to the fastening surface of the main frame is formed at the upper end of the division bar. Further, an insert nut is embedded in an upper end of the division bar so that an axial end surface is exposed at a fastening surface of the division bar. A sealing component made of a resin softer than the division bar is provided around the upper end of the division bar.

3 Claims, 7 Drawing Sheets

Prior art

VEHICLE DOOR STRUCTURE AND MANUFACTURING METHOD FOR VEHICLE DOOR STRUCTURE

CROSS REFERENCE TO RELATED APPLICATION

This application claims priority to Japanese Patent Application No. 2022-179787, filed on Nov. 9, 2022, which is incorporated herein by reference in its entirety including the specification, claims, drawings, and abstract.

TECHNICAL FIELD

In this specification, a vehicle door structure and a method of manufacturing the vehicle door structure are disclosed.

BACKGROUND

The vehicle door includes, as window components, a vertically slidable window and a fixed window. For example, the front door is provided with a fixed window at a relatively forward portion. For example, the front door is provided with a vertically slidable window at a relatively rear portion.

As a frame bar component separating a fixed window and a vertically slidable window, for example, a division bar as shown in JP2020-200008(A) is provided in the vehicle door. The division bar extends substantially in the vertical direction. A guide groove is formed in the division bar for guiding a window which can slide up and down. A fitting groove is formed in the division bar on the opposite side of the guide groove. A fixed window is fitted into the fitting groove.

Further, seal parts such as a weather strip and a glass run are attached to the guide groove and the fitting groove. For example, notches are formed in the fitting grooves and the guide grooves. A lip is formed on a weather strip or a glass run. The lip is inserted into the notch.

At JP2021-104708(A), a structure for fastening an upper end of a division bar to a window frame of a vehicle door is disclosed. In this document, the division bar is a molded product of a metal plate.

Referring to FIG. 7, a seal component 112 is connected to the upper end of a division bar 110. The upper end of the seal component 112 is brought into contact with the window frame 100. The division bar 110 is fastened to the window frame 100 via a bracket 120.

The bracket 120 includes a leg plate 122 and a seat plate 124. The leg plate 122 extends in the vertical direction along the division bar 110. The seat plate 124 extends substantially in the front-rear direction along the window frame 100. A bent portion 126 is formed in the bracket 120. The bent portion 126 connects the upper end of the leg plate 122 and the rear end of the seat plate 124.

In some cases, the seat plate 124 of the bracket 120 is spaced downward from the window frame 100. In such a case, when the bracket 120 is bolted to the window frame 100, the bracket 120 and the division bar 110 are pulled up by the axial force.

However, a weather strip and a glass run are attached to the division bar 110 in the vertical direction. Contact friction with these sealing components prevents pulling up of the division bar 110. As a result, the bent portion 126 of the bracket 120 may open, that is, a so-called bending deformation may occur. In such a case, a gap is generated between the window frame 100 and the division bar 110 or the seal component 112. As a result, so-called wind noise may leak into the vehicle interior.

In the present specification, there is disclosed a vehicle door structure capable of improving sealing properties more than in the prior art.

SUMMARY

A vehicle door structure is disclosed herein. The vehicle door structure includes a main frame, a fixed window, a vertically slidable window, and a division bar. The main frame is an upper part of the window sash of the vehicle door. The main frame extends in the longitudinal direction of the vehicle. A fixed window and a vertically slidable window are disposed in the window sash. The fixed window and the vertically slidable window are aligned in the longitudinal direction of the vehicle. The division bar is provided between a fixed window and a vertically slidable window. The division bar is formed of a resin. A fastening surface is formed at the upper end of the division bar. The fastening surface faces the fastening surface of the main frame. Further, an insert nut is embedded in the upper end of the division bar. The axial end surface of the insert nut is exposed on the fastening surface of the division bar. Within the area around the upper end of the division bar is provided at least one sealing component. The at least one sealing component is softer than the resin of the division bar.

According to the above configuration, the fastening surface opposed to the main frame is provided at the upper end of the division bar made of resin. Further, an insert nut is embedded in the fastening surface. As described above, in the vehicle door structure according to the present embodiment, the division bar and the main frame can be fastened to each other without the bending portion, in other words, by the alignment of the linear components.

Also disclosed herein is a method for manufacturing the vehicle door structure described above. In this manufacturing method, the division bar and at least one sealing component are molded by two-color molding.

By forming the division bar and the seal part by two-color molding, the number of parts can be reduced as compared with the case of assembling separate parts.

In the vehicle door structure described above, at least one seal component may be composed of two sponge components. The two sponge parts are respectively attached to the front and rear ends of the upper end of the division bar along the longitudinal direction of the vehicle.

According to the above configuration, for example, a coking sponge used in another place as a sealing component of a vehicle door structure is used as a sealing component. Thus, the manufacturing cost can be reduced due to the common use of components.

In the vehicle door structure described above, the at least one sealing component may be formed in a ring shape surrounding a fastening surface of the division bar. The at least one sealing component may also be detachable from the division bar. Claw is formed on the fastening surface of the division bar. The Claw is directed outward with respect to the axial center of the division bar. Engagement grooves are formed by the fastening surfaces of the claw and the division bar. The engagement groove opens outward with respect to the axial center of the division bar. The at least one sealing component has an insertion hole. The insertion hole is defined to receive claw therein. Further, the at least one sealing component has an inner protrusion protruding from the inner wall of the insertion hole. The inner protrusion protrudes toward the axial center of the division bar. The inner protrusion is configured to engage with the engagement groove. The side surface of the engagement groove is inclined obliquely upward. That is, the side surface of the engagement groove extends upward while leaving away from the axial center of the division bar. The inner protrusion is inclined obliquely downward. That is, the inner protrusion extends downward while approaching the axial center of the division bar.

According to the above configuration, when the division bar is bolted to the main frame, the seal component is pulled to the axial center side of the division bar based on the upward inclination shape of the engagement groove and the downward inclination shape of the inner protrusion engaged with the engagement groove. This makes it difficult for the seal component to protrude from the division bar during the fastening operation.

According to the vehicle door structure disclosed in this specification, the sealing performance can be improved more than in the prior art.

DESCRIPTION OF EMBODIMENTS

Figure 1:
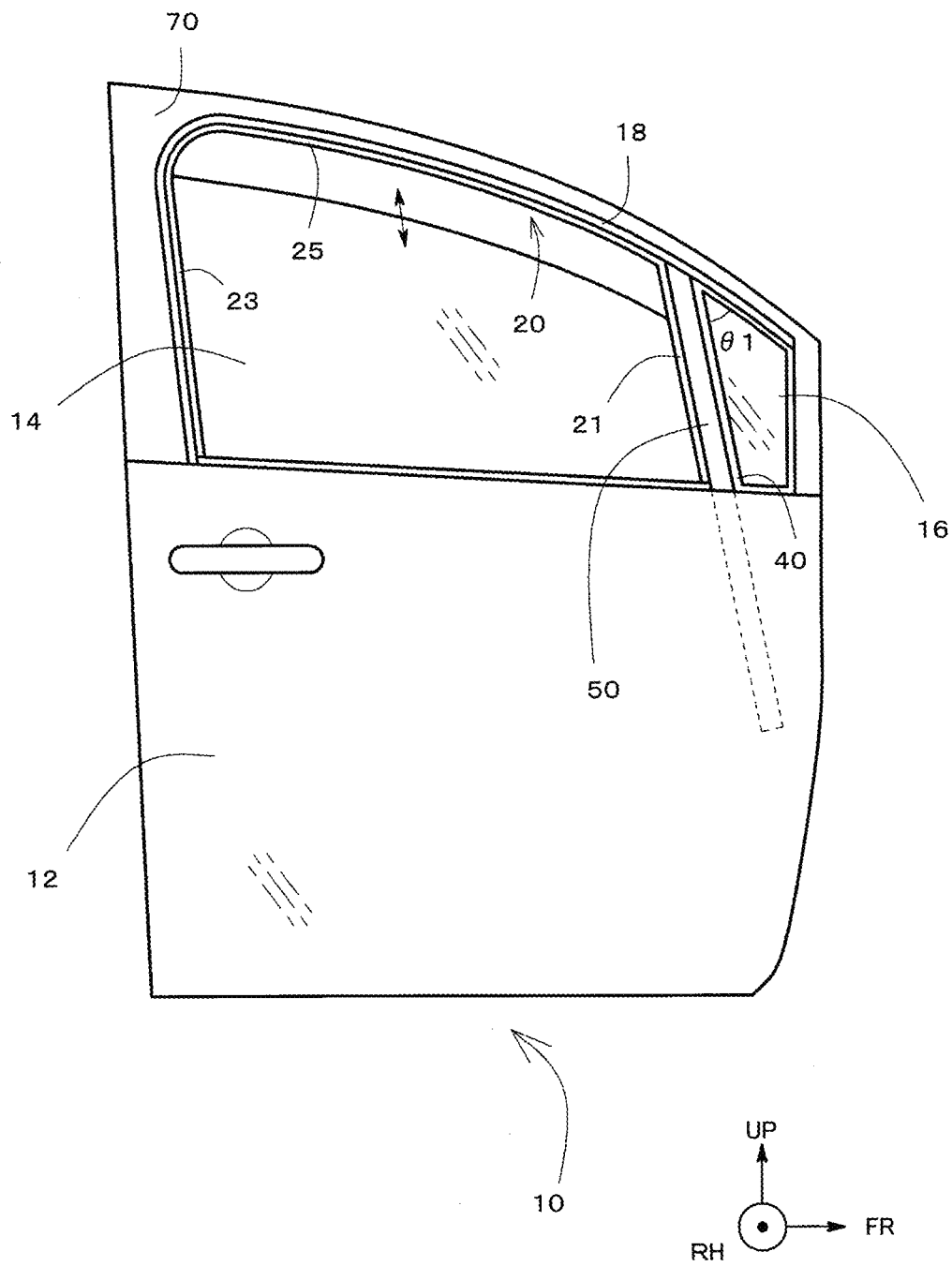
FIG. 1 is a side view illustrating a right front door as a vehicle door structure according to the present embodiment.

Hereinafter, a vehicle door structure according to an embodiment of the present disclosure will be described with reference to the accompanying drawings. The shapes, materials, numbers, and numerical values described below are illustrative examples, and can be appropriately changed according to the specifications of the vehicle door structure. In the following, the same reference numerals are given to the same elements in all the drawings.

In FIGS. 1 to 7, an orthogonal coordinate system including an FR axis, an RH axis, and an UP axis is used to represent the position and the direction of each component. The FR axis is a vehicle longitudinal axis whose positive direction is the front of the vehicle. The RH axis is a vehicle width direction axis whose positive direction is the right side of the vehicle. The UP axis is a vertical axis of the vehicle in which the upward direction is a positive direction.

FIG. 1 illustrates a right front door of a vehicle as a vehicle door structure. However, the vehicle door structure according to the present embodiment can be applied as long as it is a door having a fixed window, a vertically slidable window, and a division bar which separates both windows.

Figure 2:
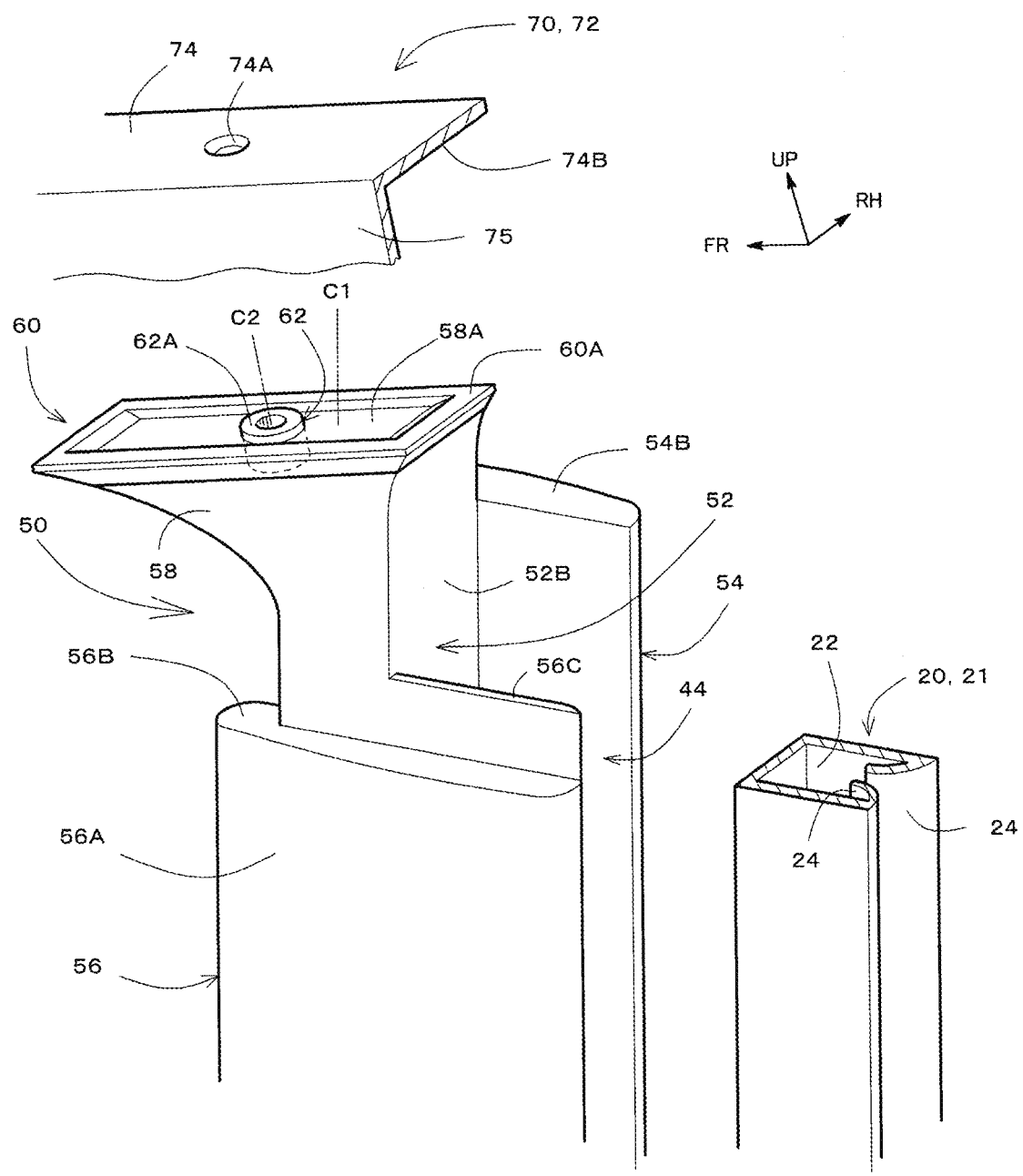
FIG. 2 is an exploded perspective view illustrating a structure around an upper end of a division bar of the vehicle door structure according to the present embodiment.

As illustrated in FIGS. 1 and 2, the vehicle door structure according to the present embodiment includes a main frame 72 of a window sash 70, a fixed window 16, a vertically slidable window 14, a division bar 50, and a seal component 60. These detailed structures are described below.

<Summary of the Vehicle Door Structure>

As illustrated in FIG. 1, the vehicle door 10 includes a door body 12 and a window sash 70. For example, the window sash 70 is formed by rolling a metal plate made of iron, aluminum, or the like. The window sash 70 is joined to a door inner panel (not shown) which is a part of the door main body 12 by welding or the like.

The vehicle door illustrated in FIG. 1 is a so-called sash door in which the door main body 12 and the window sash 70 are separate members. However, the vehicle door structure according to the present embodiment is not limited to the sash door. In short, the vehicle door structure according to the present embodiment can be applied as long as the vehicle door includes a sachet having a main frame 72 to which the upper end 58 of the division bar 50 is fastened. For example, the vehicle door structure according to the present embodiment can be applied to a panel door in which a door body and a window sash are integrally formed.

As illustrated in FIG. 1, the fixed window 16 and the vertically slidable window 14 are arranged in the window opening of the door 10, in other words, in the window sash 70. The fixed window 16 and the vertically slidable window 14 are arranged in the longitudinal direction of the vehicle. As shown in FIG. 1, in the front door of the vehicle, the fixed window 16 is disposed relatively forward. Further, the vertically slidable window 14 is disposed rearward. On the other hand, in the rear door of the vehicle, the fixed window 16 is disposed relatively rearward. Further, the vertically slidable window 14 is disposed forward. The vertically slidable window 14 can be raised and lowered by a power window regulator (not shown).

A division bar 50 is provided between the fixed window 16 and the vertically slidable window 14. The division bar 50 also functions as a guide part of the window 14 which can slide up and down. Therefore, the division bar 50 extends below the window opening of the door 10. The detailed structure of the division bar 50 will be described later.

The door 10 is provided with a plurality of sealing components around the window. For example, a weather strip 40 for the fixed window is provided so as to surround the fixed window 16. Further, a glass run 20 is provided on the division bar 50 and the window sash 70. The glass run 20 is made of a soft resin material such as rubber.

For example, the glass run 20 is formed in a gate shape in a side view. The glass run includes a glass run front 21, a glass run rear 23, and a glass run upper 25. The glass run front 21 extends in the vertical direction along the division bar 50. The glass run rear 23 extends in the vertical direction along the backward vertical frame of the window sash 70. The glass run upper 25 is connected to the upper ends of the glass run front 21 and the glass run rear 23. Further, the glass run upper 25 extends in the front-rear direction along the main frame 72 (see FIG. 3) of the window sash 70.

Further, a part of the vehicle outside exposed surface of the window sash 70 may be covered with the windmill 18. For example, the window moulding 18 is made of a metal such as SUS or a composite material of a metal and a resin. By providing the window moulding 18 around the window frame of the vehicle door, a design effect can be obtained in which the window frame is seen finely. Similarly, a part of the vehicle inside exposed surface of the window sash 70 may be covered with a frame garnish (not shown) which is an interior part.

<Structure of the Upper Portion of the Division Bar>

Figure 3:
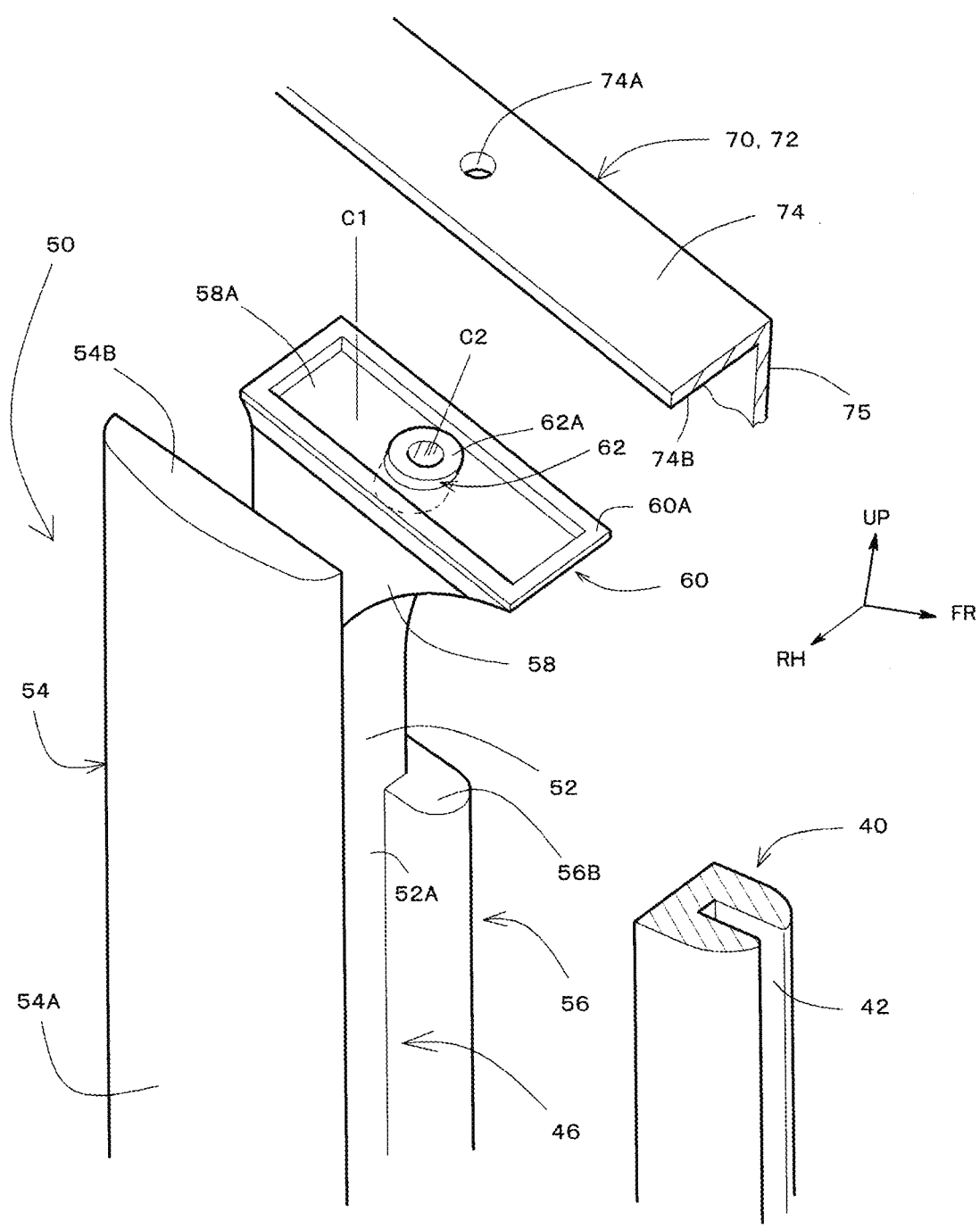
FIG. 3 is an exploded perspective view illustrating a structure around an upper end of the division bar in an angle different from FIG. 2.

FIG. 2 illustrates a structure around an upper portion of the division bar 50 in the vehicle door structure according to the present embodiment. For example, FIG. 2 exemplifies the vehicle door structure viewed from the vehicle interior with the left side of the drawing as the front side of the vehicle. FIG. 3 illustrates the vehicle door structure when the right front door of FIG. 1 is viewed from the outside of the vehicle with the right side of the drawing as the front side of the vehicle.

As illustrated in FIG. 1, the division bar 50 extends linearly in the substantially vertical direction, but is inclined backward with respect to the vertical axis (UP axis) so as to be inclined rearward of the vehicle. Therefore, in FIG. 2 to FIG. 6, the extending direction of the division bar 50 is set to the vertical direction, and the vertical axis (UP axis) is inclined with respect to the vertical direction of the sheet. Similarly, the longitudinal axis (FR axis) of the vehicle is also inclined with respect to the lateral direction of the sheet.

The division bar 50 is made of resin. For example, the division bar 50 is made of a resin material such as polypropylene. As illustrated in FIG. 1, a fixed window 16 is provided in front of the division bar 50. Further, a vertically slidable window 14 is provided at the rear of the division bar 50. As illustrated in FIG. 3, a fitting groove 46 is formed in a front portion of the division bar 50. The fixed window 16 is fitted into the fitting groove 46. As illustrated in FIG. 2, a guide groove 44 is formed in a rear portion of the division bar 50. The guide groove 44 guides the vertically slidable window 14.

More specifically, the division bar 50 includes a main body 52, an outer plate 54, and an inner plate 56. The main body 52 has a prismatic column shape. The outer plate 54 is provided outside the main body 52 in the vehicle width direction. The inner plate 56 is provided inside the main body 52 in the vehicle width direction.

The outer plate 54 protrudes beyond the main body 52 in the longitudinal direction of the vehicle. Similarly, the inner plate 56 protrudes beyond the main body 52 in the longitudinal direction of the vehicle. Accordingly, the front surface 52A of the main body 52, the outer plate 54, and the inner plate 56 form the fitting groove 46 having a cross-sectional gate shape in the front portion of the division bar 50. A weather strip 40 for the fixed window 16 is fitted into the fitting groove 46.

A fitting groove 42 is formed in the weather strip 40 which is open to the front of the vehicle. An edge of the fixing window 16 is fitted into the fitting groove 42. The weather strip 40 is made of a soft resin material such as rubber.

Referring to FIG. 2, an auxiliary plate 56C extends from an upper end surface 56B of inner plate 56 and a rear surface 52B of main body 52. The auxiliary plate 56C extends in the longitudinal direction of the vehicle. The separation distance (groove width) between the auxiliary plate 56C and the outer plate 54 and the separation distance between the inner plate 56 and the outer plate 54 are set to be the same.

With respect to the rear portion of the division bar 50, the rear surface 52B of the main body 52, the outer plate 54, the inner plate 56, and the auxiliary plate 56C form a cross-sectional gate-shaped guide groove 44. The glass run front 21 is fitted into the guide groove 44.

The glass run front 21 includes a guide groove 22 and a pair of seal lips 24, 24. The guide groove 22 has a gate-shaped cross section. The pair of seal lips 24, 24 extends from the side wall end of the guide groove 22 into the groove. The front edge of the vertically slidable window 14 is inserted into the guide groove 22. The front edge of the vertically slidable window 14 slides with respect to the seal lips 24, 24 during elevation.

The outer side surface of the outer plate 54 in the vehicle width direction is an outer exposed surface 54A which is an exposed surface to the outside of the vehicle. The upper end surface 54B of the outer plate 54 functions as a so-called alignment surface. For example, the bottom surface of the main frame 72 of the window sash 70 or the bottom surface of the window mall 18 (see FIG. 1) contacts on the upper end surface 54B.

The inner side surface of the inner plate 56 in the vehicle width direction is an inner exposed surface 56A which is an exposed surface to the vehicle compartment. The upper end surface 56B of the inner plate 56 functions as, for example, an alignment surface of the window sash 70 with the main frame 72 or a frame garnish (not shown).

<Fastening Structure of Division Bar and Main Frame>

As illustrated in FIGS. 1-3, the window sash 70 includes a main frame 72 as an upper part. FIGS. 2 and 3 show a part of the window sash 70. More specifically, portions of the window sash 70 associated with fastening with the vehicle door structure according to the present embodiment are shown.

The main frame 72 extends in the longitudinal direction of the vehicle. More specifically, the main frame 72 extends in a downward inclined manner. That is, the main frame 72 is inclined downward toward the front of the vehicle.

FIGS. 2 and 3 illustrate partial cross-sectional shapes of the main frame 72. For example, the main frame 72 includes a horizontal plate 74 and a vertical plate 75. The horizontal plate 74 is disposed substantially horizontally. The vertical plate 75 is disposed in a substantially vertical direction. A fastening hole 74A is formed in the horizontal plate 74 along the thickness thereof. The lower surface of the horizontal plate 74 serves as a fastening surface 74B of the main frame 72. The fastening surface 74B faces the fastening surface 58A of the division bar 50.

A bolt (not shown) is inserted into the fastening hole 74A. The bolt is screwed into the insert nut 62. The bolt is composed of, for example, a dish screw. Further, for example, the fastening hole 74A is formed by so-called countersinking so as to accommodate the head of the bolt. That is, the fastening hole 74A is formed in a mortar shape in cross section. That is, the hole diameter of the fastening hole 74A becomes smaller toward the fastening surface 74B.

Referring to FIGS. 2 and 3, the upper end 58 of the division bar 50 is an enlarged diameter portion. That is, the upper end 58 has a larger diameter than the main body portion 52 toward the upper side. In order to provide sufficient sealing properties, the diameter of the upper end 58 is increased in a curved manner in a side view. For example, the ridge line of the upper end 58 and the ridge line of the seal component 60 are continuously connected without a step.

A fastening surface 58A is formed at the upper end 58. The fastening surface 74B provided on the main frame 72 of the window sash 70 and the fastening surface 58A of the division bar 50 face each other.

The angle of the fastening surface 58A is determined such that the fastening surface 58A and the fastening surface 74B are parallel to each other when assembling the vehicle door structure. For example, referring to FIG. 1, the angle of the fastening surface 58A with respect to the main body portion 52 of the division bar 50 is determined according to the angle θ1 between the upper end of the division bar 50 and the window sash 70 (main frame 72). For example, referring to FIG. 2, the angle of the fastening surface 58A is determined so as to be inclined with respect to the central axis C1 of the main body 52 extending linearly.

An insert nut 62 is embedded in the upper end 58 of the division bar 50-, by insert molding or press fitting. The axial end surface 62A of the insert nut 62 is exposed on the fastening surface 58A. In FIG. 2 to FIG. 6, illustration of a screw groove formed in the inner peripheral surface of the insert nut 62 is omitted.

The insert nut 62 is embedded in the upper end 58 such that the screw shaft C2 is perpendicular to the fastening surface 58A. As described above, the fastening surface 58A is inclined with respect to the central axis C1 of the main body 52. Therefore, the screwing axis C2 perpendicular to the fastening surface 58A is also inclined with respect to the central axis C1.

The insert nut 62 is embedded, for example, in the center of the fastening surface 58A in the vehicle width direction and the front-rear direction. The insert nut 62 is embedded in the upper end 58 such that the axial end face 62A slightly protrudes along the screw axis C2 with respect to the fastening face 58A.

Since the axial end surface 62A protrudes from the fastening surface 58A, a so-called metal touch in which the insert nut 62 and the main frame 72 are brought into contact with each other becomes possible. For example, when the division bar 50, which is a resin component, and the main frame 72, which is a metal component are brought into contact with each other and fastened, there is a possibility that the axial force of the bolt fastening decreases due to deterioration of the division bar 50. This lowers the sealing performance between the division bar 50 and the main frame 72.

Therefore, in the vehicle door structure according to the present embodiment, the axial end surface 62A protrudes from the fastening surface 58A. This makes it possible to reliably perform metal touch between the insert nut 62 and the main frame 72. Thereby, the axial force of bolt fastening is maintained.

Figure 6:
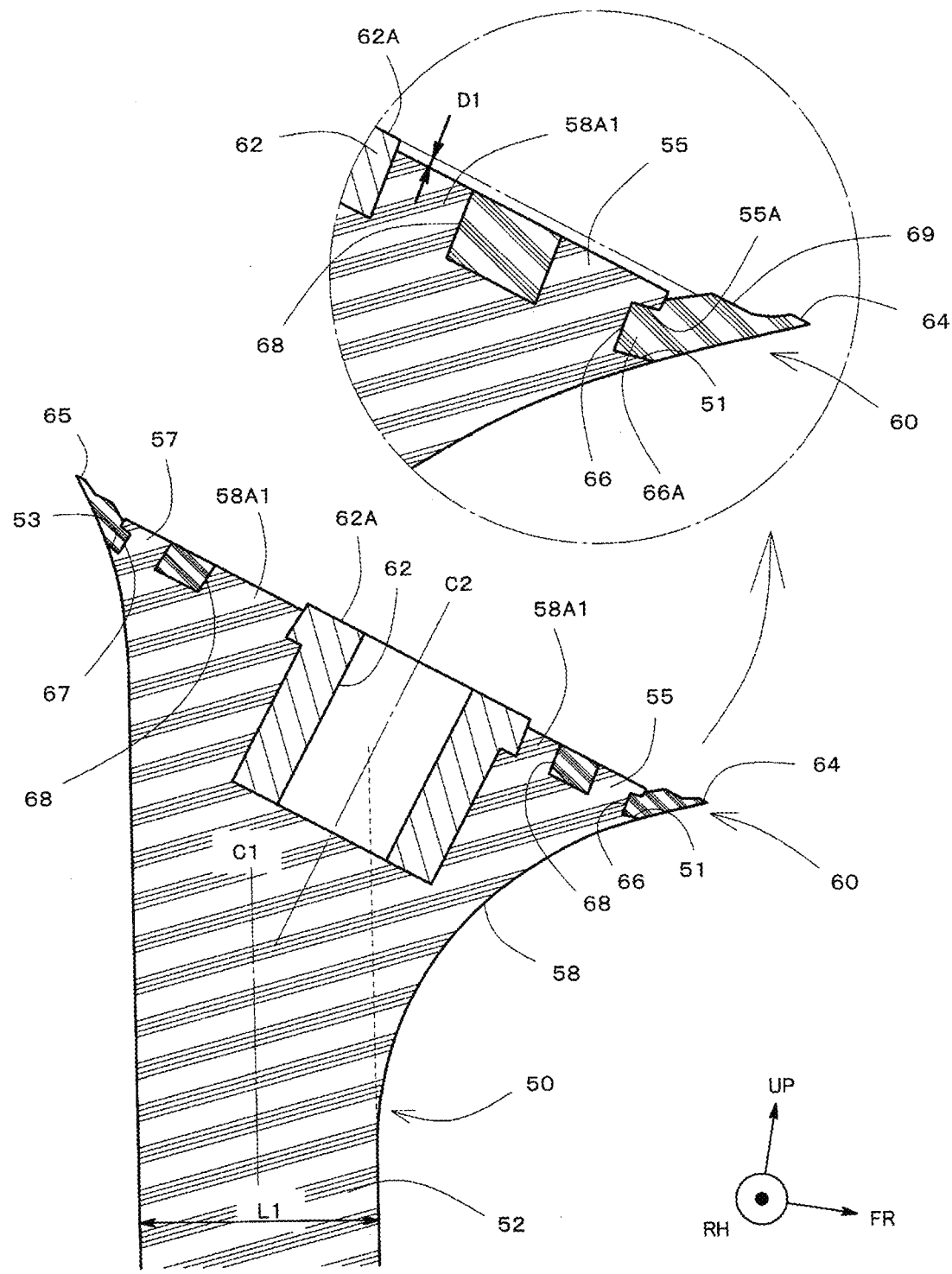
FIG. 6 is a cross-sectional view taken along the line A-A of FIG. 5 when a sealing component is attached to the division bar.
Figure 7:
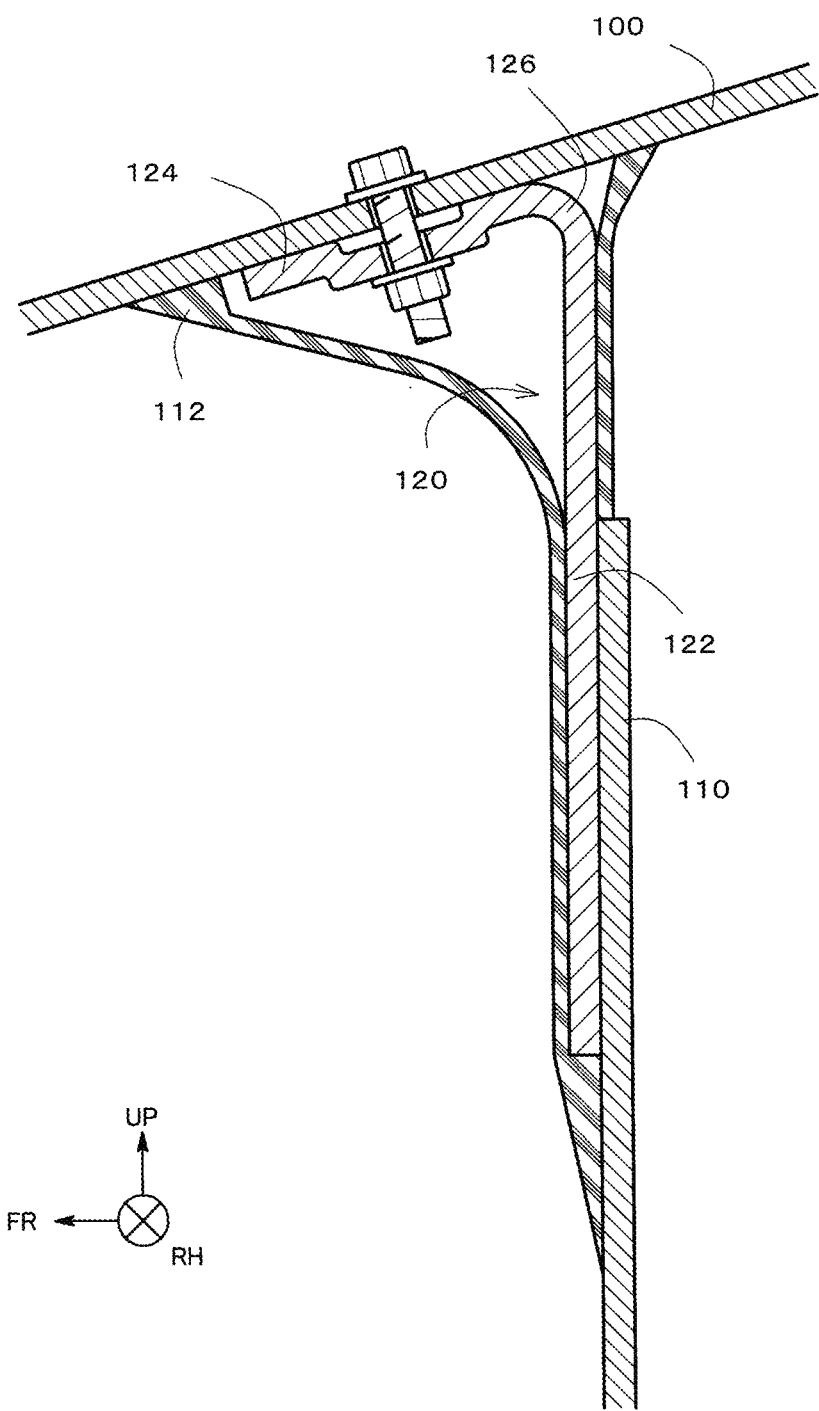
FIG. 7 is a cross-sectional view illustrating a structure around an upper end of a conventional division bar.

Here, for example, as illustrated in FIG. 6, the insert nut 62 is embedded in the upper end 58 so that at least a part of the insert nut 62 is included in the diameter L1 of the main body 52. When the insert nut 62 is provided at a position spaced apart from the main body portion 52 in the vehicle longitudinal direction or the vehicle width direction, a path from the main body portion 52 to the insert nut 62 may have an L-shaped structure with a bent portion. On the other hand, as shown in FIG. 6, since at least a part of the insert nut 62 is included within the diameter L1 of the main body portion 52, it is possible to prevent a bent portion from being formed on the path from the main body portion 52 to the insert nut 62.

Referring to FIGS. 2 and 3, a sealing component 60 is provided in the area around the upper end 58. For example, the seal component 60 is formed to have an ring shape (rectangular annular shape) surrounding the fastening surface 58A. The sealing component 60 is made of a resin softer than the resin of the division bar 50, such as an olefinic thermoplastic elastomer. The upper surface of the sealing component 60 is a sealing surface 60A. The sealing surface 60A is in contact with the fastening surface 74B of the main frame 72. For example, the sealing surface 60A is formed so as to protrude from the fastening surface 58A. The seal surface 60A may be at the same height as the axial end surface 62A of the insert nut 62. Alternatively, the seal surface 60A may protrude from the axial end surface 62A of the insert nut 62. By projecting the sealing surface 60A beyond the axial end surface 62A, the sealing component 60 can reliably seal the fastening surface 74B even if manufacturing variation occurs.

For example, the sealing component 60 is molded by two-color molding with the division bar 50. Since the two-color molding is a known technology, the detailed description thereof is omitted here. For example, in a state where the division bar 50 after molding is held in the mold, the seal component 60 is molded around the upper end 58. By molding the division bar 50 and the seal component 60 by two-color molding, the contact portions between them can be welded at the time of molding. Compared to the case where the division bar 50 and the sealing component 60 are composed of detachable components, the number of components is reduced. In addition, since the deviation or the variation at the time of assembling the components is suppressed, the gap due to the deviation or the variation is suppressed.

When fastening the division bar 50 to the main frame 72, first, the fastening surface 58A of the division bar 50 and the fastening surface 74B of the main frame 72 face each other. Further, the fastening hole 74A of the flat plate 74 and the insert nut 62 are aligned. Further, a bolt (not shown) is screwed into the fastening hole 74A and the insert nut 62.

An axial force is generated in the insert nut 62 in the course of screwing. Thereby, the division bar 50 is pulled upward. As described above, the insert nut 62 is provided on the extension line of the main body portion 52, and has no bending structure. As a result, the main body portion 52 is pulled up linearly.

In the process of pulling up, the seal component 60 comes into contact with the fastening surface 74B of the main frame 72 and is further deformed. Thus, a sealing effect can be obtained. Since the axial end surface 62A of the insert nut 62 protrudes from the fastening surface 58A as described above, the axial end surface 62A and the fastening surface 74B are reliably brought into contact with each other.

First Alternative Example of the Vehicle Door Structure

Figure 4:
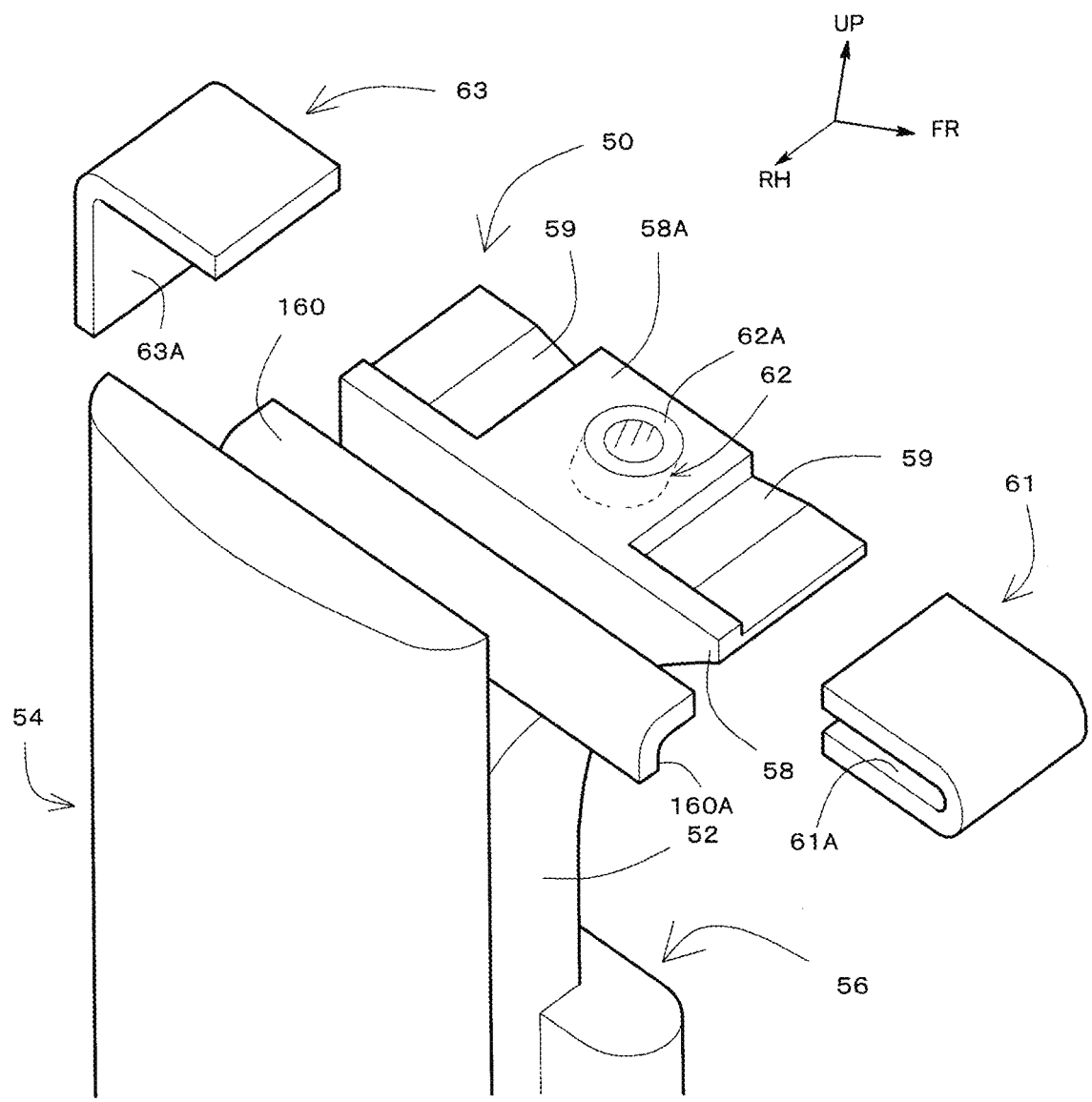
FIG. 4 is a perspective view illustrating the division bar according to the first alternative example of the present embodiment.

FIG. 4 illustrates the first alternative example of the vehicle door structure according to the present embodiment. In this alternative example, the configurations other than the upper end 58 of the division bar 50 and the seal components 61, 63 and 160 are the same as those in FIGS. 2 and 3. Therefore, components other than the upper end 58 of the division bar 50 and the seal components 61, 63, and 160 are omitted as appropriate.

In this example, seal parts 61 and 63 are provided around the upper end 58. More specifically, the seal parts 61 and 63 are respectively attached to the front end and the rear end of the upper end 58 along the longitudinal direction of the vehicle. Further, a seal component 160 is provided outside the upper end 58 in the vehicle width direction. The seal parts 61, 63, and 160 are formed of a coking sponge, for example. For example, the sponge material is used as a soundproof material in the front door. By applying the materials already used in the other portions of the front door to the seal parts 61, 63, and 160, the cost can be reduced due to the commonality of the materials. Further, by omitting the two-color molding, the cost can be reduced by the molding.

The seal parts 61, 63, and 160 are sheet-shaped. Further, an adhesive may be applied to the contact surfaces 61A, 63A, and 160A contacting the upper end 58. Further, at the upper end 58, concave portions 59, 59 may be formed at the front-rear direction end portions thereof for positioning.

Second Alternative Example of the Vehicle Door Structure

Figure 5:
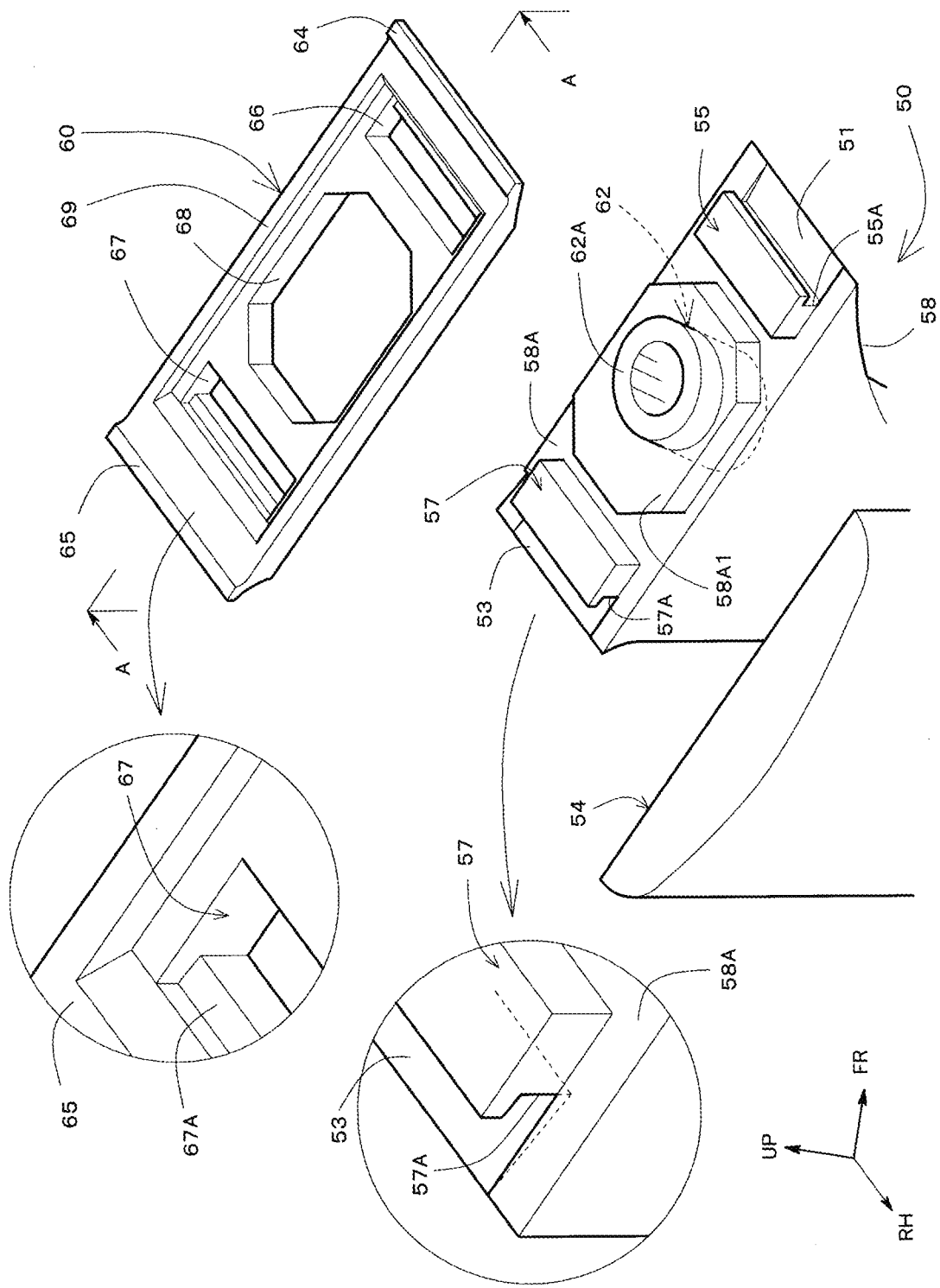
FIG. 5 is a perspective view illustrating the division bar according to the second alternative example of the present embodiment.

FIGS. 5 and 6 illustrate the second alternative example of the vehicle door structure according to the present embodiment. In this example, the configurations other than the upper end 58 of the division bar 50 and the seal component 60 are the same as those in FIGS. 2 and 3. Therefore, components other than the upper end 58 of the division bar 50 and the seal components 61, 63, and 160 are omitted as appropriate.

In this example, the sealing component 60 is detachable from the division bar 50. The sealing component 60 is, for example, a rectangular annular shape surrounding the fastening surface 58A of the division bar 50. The sealing component 60 is made of a resin softer than the division bar 50, such as an olefinic thermoplastic elastomer.

In general, when two-color molding is performed using different materials, there is a possibility that the adhesiveness of both components is reduced as compared with the case where two-color molding is performed using the same material. Therefore, strict management of molding conditions is required. Further, the strictness causes complicated forming steps. In the vehicle door structure according to the present embodiment, the division bar 50 and the seal component 60 are formed as detachable separate components. Further, the vehicle door structure according to the present embodiment is provided with an engagement mechanism described later. This makes it possible to secure adhesiveness without requiring cost for two-color molding.

An opening 68 is formed in the seal part 60 at a central portion corresponding to the insert nut 62. From this point, the seal component 60 has a ring shape (rectangular ring shape) surrounding the fastening surface 58A. The opening 68 is formed to have, for example, a polygonal shape.

As illustrated in FIG. 5, the upper end 58 of the division bar 50 is provided with a guide protrusion 58A1 corresponding to the opening 68 of the seal component 60. The guide protrusion 58A1 has the same shape as the opening 68.

A seal frame 69 is formed on the upper surface of the seal component 60 so as to surround the edge of the seal component 60. The seal frame 69 is a rectangular frame body, for example, and protrudes from the upper surface of the seal component 60. For example, referring to FIG. 6, when the seal component 60 is mounted on the division bar 50, the seal frame 69 is formed such that the height of the upper surface of the seal frame 69 is equal to the height of the axial end surface 62A of the insert nut 62. Alternatively, the upper surface of the seal frame 69 may protrude from the axial end surface 62A. By projecting the upper surface of the seal frame 69 beyond the axial end surface 62A, the seal frame 69 can securely seal the fastening surface 74B of the main frame 72 even if manufacturing variation occurs.

Further, convex portions 64 and 65 are formed at both longitudinal ends of the seal frame 69. The convex portions 64 and 65 are formed so as to protrude from the seal frame 69. In addition to the seal frame 69, the convex portions 64 and 65 ensure sealing performance between the main frame 72 and the division bar 50.

Further, an engagement mechanism is provided on both the sealing component 60 and the upper end 58 of the division bar 50. That is, the insertion holes 66 and 67 are formed in the front and rear of the opening 68 of the seal component 60. Claws 55 and 57 project from the fastening surface 58A of the division bar 50. The claws 55 and 57 are designed to point outward with respect to the central axis C1 of the division bar 50. The claws 55 and 57 are inserted into the insertion holes 66 and 67.

The insertion holes 66 and 67 have a hole shape conforming to the shape of the claws 55 and 57. For example, as illustrated in enlarged views of FIGS. 5 and 6, inner projections 66A and 67A protruding toward the central axis C1 of the division bar 50 are formed on inner walls of the insertion holes 66 and 67. On the other hand, in the division bar 50, engagement grooves 55A and 57A are formed by the claws 55 and 57 and the fastening surface 58A. The engagement grooves 55A and 57A are formed to have a U-shaped cross section. The engagement grooves 55A and 57A open outward with respect to the central axis C1 of the division bar.

More specifically, inclined surfaces 51 and 53 are formed on both longitudinal ends of the fastening surface 58A, which are separated from the central axis C1 and the screw axis C2 more than the claws 55 and 57. A pair of facing side surfaces are formed in the engagement grooves 55A and 57A. The inclined surfaces 51 and 53 and the lower surfaces of the claws 55 and 57 facing the inclined surfaces 51 and 53 form two pairs of side surfaces of the engagement grooves 55A and 57A. The inclined surfaces 51 and 53 and the lower surfaces of the claws 55 and 57 extend upward while leaving away from the central axis C1 and the screw axis C2. Thereby, the pair of side surfaces of the engagement grooves 55A and 57A are formed in an inclined obliquely upward shape. That is, a pair of side surfaces of the engagement grooves 55A and 57A extend upward so as to be separated from the central axis C1 and the screw axis C2 of the division bar 50.

On the other hand, the inner protrusions 66A and 67A are formed in a downward inclined shape. That is, the inner protrusions 66A and 67A extend downward while approaching the central axis C1 and the screw axis C2 of the division bar 50. In such a structure, axial force is applied when the division bar 50 is bolted to the main frame 72. By this axial force, the inner projections 66A and 67A are drawn toward the central axis C1 of the division bar 50 and toward the screw shaft C2 of the insert nut 62. This makes it possible to suppress protrusion of the seal component 60 from the division bar 50 during fastening.

Similarly to FIG. 2, the axial end surface 62A of the insert nut 62 is positioned so as to protrude from the fastening surface 58A. More specifically, as illustrated by the interval D1 in FIG. 6, the amount of embedding of the insert nut 62 is determined so that the axial end surface 62A protrudes beyond the guide projections 58A1 and the claws 55 and 57.

By such positioning, so-called metal touch in which the insert nut 62 and the main frame 72 (see FIG. 2) abut each other is reliably performed. As a result, the sealing performance between the division bar 50 and the main frame 72 is maintained.

As described above, the axial end surface 62A of the insert nut 62 has the same height as the seal frame 69 of the seal component 60. Alternatively, the seal frame 69 slightly protrudes from the axial end surface 62A. With such a structure, the insert nut 62 and the seal component 60 only abut on the main frame 72. As a result, contact between the resin component and the main frame 72 is avoided.

The present disclosure is not limited to the present embodiments described above, and includes all changes and modifications without departing from the technical scope or the essence of the present disclosure defined by the claims.

The invention claimed is:

1. A vehicle door structure comprising:
a main frame constituting an upper part of a window sash disposed on a vehicle door, the main frame extending along a vehicle longitudinal direction;
a fixed window and a vertically slidable window aligned with each other in the vehicle longitudinal direction within the window sash; and
a division bar provided between the fixed window and the vertically slidable window; wherein
the division bar is formed of a resin,
a fastening surface is formed on an upper end of the division bar, the fastening surface facing a fastening surface of the main frame,
an insert nut is embedded in the upper end of the division bar with an axial end surface of the insert nut being exposed on the fastening surface of the division bar, and
at least one seal component is provided in a region around the upper end of the division bar, and is formed of a resin which is softer than the resin of the division bar, wherein:
the at least one seal component is formed in a ring shape surrounding the fastening surface of the division bar, and is configured to be detachable from the division bar;
a claw is formed on the fastening surface of the division bar, the claw being designed to point outward with respect to the axial center of the division bar;
an engagement groove is formed by the claw and the fastening surface of the division bar, the engagement groove being open outward with respect to the axial center of the division bar;
the at least one of the seal component has an insertion hole defined to receive the claw therein, and has an inner protrusion protruding from an inner wall of the insertion hole toward the axial center of the division bar, the inner protrusion being configured to engage with the engagement groove;
a side surface of the engagement groove is inclined obliquely upward so as to extend upward while leaving away from the axial center of the division bar; and
the inner protrusion is inclined obliquely downward so as to extend downward while approaching the axial center of the division bar.

2. A method for manufacturing the vehicle door structure according to claim 1, wherein the division bar and the at least one seal component are molded by two-color molding.

3. The vehicle door structure according to claim 1, wherein the at least one seal component comprises two sponge members respectively attached to a front end and a rear end, in the vehicle longitudinal direction, of the upper end of the division bar.

* * * * *